3,232,761
HARDENING OF PHOTOGRAPHIC GELATIN LAYERS

Charles F. H. Allen and Donald M. Burness, Rochester, N.Y., assignors to Eastman Kodak Company, Rochester, N.Y., a corporation of New Jersey
No Drawing. Filed May 25, 1965, Ser. No. 458,764
18 Claims. (Cl. 96—66)

This application is a continuation-in-part of applications, Serial Nos. 556,031, filed December 29, 1955; 18,472, filed March 30, 1960; and 378,041, filed June 25, 1964.

This invention relates to the hardening of photographic gelatin coatings that is of gelatin having a jelly strength of at least 150 g. Bloom, by treating those coatings with aqueous solutions containing a dialdehyde, the aldehyde groups of which are separated by 2–3 carbon atoms, or the bisulfite adduct of a dialdehyde, the aldehyde groups of which are separated by 3 carbon atoms. This invention also includes compositions containing said aldehydes or aldehyde derivatives and pH buffering materials and which may or may not contain a solubilized anthraquinone, a polyhydroxy benzene such as resorcinol or phloroglucinol or some other additive useful in processing those gelatin layers.

Some aldehydes have been mentioned previously as useful for the hardening of gelatin coatings. Probably the most widely mentioned material of this type is formaldehyde which is extremely active as a hardening agent for gelatin. Formaldehyde often exhibits undesirable photographic properties, in some situations may be toxic and has a detrimental effect upon certain photographic developing agents; hence, the desirability of replacing formaldehyde with some other effective hardening agent. Glyoxal has been mentioned in this connection but has not shown itself to be as effective as a gelatin hardener as formaldehyde and has poor keeping qualities. The presence of glyoxal in developing solutions is ordinarily undesirable. Various other hardening agents for gelatin have been mentioned, but up to the present time the search continues for such materials having desirable properties but free of undesirable properties exhibited by previous hardeners.

One object of our invention is to provide a gelatin hardening material having active gelatin hardening properties and other characteristics which make it desirable for use in solutions employed for the treatment of photographic gelatin layers. Another object of our invention is to provide a hardening agent, for gelatin coatings, effective under either acid, neutral or alkaline conditions. A further object of our invention is to provide a gelatin hardening material which does not reduce the effectiveness of amino developing agents as found in some types of photographic developers. A still further object of our invention is to provide a solution, which hardens gelatin coatings, containing an aliphatic dialdehyde, the aldehyde groups of which are separated by a linear carbon chain of 2–3 carbon atoms or the alkali metal bisulfite derivative of a dialdehyde, the aldehyde groups of which are separated by 3 carbon atoms which solution may or may not contain a solubilized anthraquinone antifoggant or a polyhydroxy benzene. Other objects of our invention will appear herein.

We have found that dialdehydes, the aldehyde groups of which are separated by a linear chain of 2–3 carbon atoms, which chain has no more than three substituents thereon other than hydrogen being alkyl and/or alkoxy of 1–4 carbon atoms when substituents are present (or the bisulfite addition compounds of a dialdehyde, the aldehyde groups of which are separated by 3 carbon atoms) are characterized by being active hardeners for gelatin of a jelly strength of at least 15 g. Bloom but do not exhibit undesirable properties such as are found in many gelatin hardeners previously referred to. Some compounds of this type which are useful in hardening gelatin in accordance with our invention are: beta-methyl glutaraldehyde, glutaraldehyde, alpha-methyl glutaraldehyde, maleic dialdehyde, succinic dialdehyde, methoxy succinic dialdehyde, alpha-alpha-dimethyl glutaraldehyde, alpha-beta-dimethyl glutaraldehyde, beta-methyl glutaraldehyde bis-sodium bisulfite, maleic dialdehyde bis-sodium bisulfite, methyl maleic dialdehyde, methyl succinic dialdehyde, alpha-methyl-beta-ethoxy glutaraldehyde, alpha-n-butoxy glutaraldehyde, beta-n-butyl glutaraldehyde, beta-isopropoxy succinic dialdehyde, butyl maleic dialdehyde and the bisulfide derivatives of the dialdehydes, the aldehyde groups of which are separated by 3 carbon atoms.

The bisulfite derivatives may be those of alkali metal bisulfites, alkaline earth metal bisulfites, nitrogen base (ammonium, amines and the like) bisulfites, etc.

The pH buffering agent used with the aldehyde in the solution with which the photographic emulsion layer is treated may be a compound supplying alkali metal ions or it may be an organic type of pH buffering agent. For the latter certain organic amines having the formula

in which $R_1$=hydroxyalkyl of 1–4 carbon atoms
$R_2$=alkyl of 1–4 carbon atoms
$R_3$=either $R_1$ or $R_2$ or $SO_2$ adducts thereof or mixtures are especially useful in combination with aldehydes as specified herein.

In accordance with our invention these hardeners are employed in the form of aqueous solutions thereof and the gelatin coating may conveniently be treated during photographic processing or preliminary or subsequent thereto. Gelatin coatings hardened with these compounds are relatively free of excessive surface hardening as compared with formaldehyde hardened gelatin, and reticulation is less pronounced than with hardening with formaldehyde.

The hardening agents are ordinarily employed in the solutions with which the gelatin layer is treated in a concentration of at least 1%, but the concentration of the hardener may be varied according to the amount of hardening desired and the duration of the time of treatment of the gelatin layer. The extent of hardening of the gelatin layer is determined by taking its melting point when in contact with an aqueous bath. For instance, the melting point of a gelatin layer which has not been hardened in contact with water is ordinarily within the range of 30–35° C. whereas gelatin coatings after hardening in accordance with our invention as a rule exhibit melting points greater than 97° C. If the solution in which the hardener is used is acid or neutral, the hardener is conveniently used in the form of the free aldehyde, while in alkaline solutions a bisulfite addition product of a glutaraldehyde is more conveniently employed, in which it is converted to the form of the free aldehyde.

It has been found that occasionally the addition of other materials to the solutions containing the hardener results in improvement therein. For instance, if fogging should occur in processing a high-speed gelatin photographic emulsion with a processing solution containing a dialdehyde hardener, the addition of a solubilized anthraquinone to the processing solution effectively reduces the fogging therein. Some of the solubilized anthraquinones useful in this connection are sodium anthraquinone sulfonate, anthraquinone sulfonic acid, anthraquinone carboxylic acid, anthraquinone disulfonic acid, or the like. In the case of prehardeners containing dialdehydes, increase in hardening effect has been noted when resorcinol or phloroglucinol is present. The invention here also includes as modifications the addition of either a solubilized anthraquinone or a polyhydroxy benzene, or both, to a dialdehyde hardener solution in accordance with the invention.

We have found that the hardeners in accordance with our invention have in some cases shown advantages additional to the hardening of the gelatin. For instance, when reversal types of photographic emulsions, such as described in U.S. Patent No. 2,563,785 of Ives are treated with alkaline developing solutions containing the bisulfite of an aldehyde as listed herein, a direct positive image may be produced whereas using the same developer without beta-methyl glutaraldehyde bis(sodium bisulfite) or the like, only a faint negative image may be obtained.

The bisulfite addition compound is the preferred form of the aldehyde for use as a hardener in accordance with our invention in alkaline processing solutions, because of the unvarying stability of the bisulfite derivatives. Hydrolysis in this solution converts at least some of the material so as to present free aldehyde.

When the hardening compounds in accordance with our invention are used in processing photographic emulsion layers, it is desirable that the hardener be used in a concentration within the range of 1 gram per liter up to the limit of its solubility in the processing solution. Hardening of gelatin takes place readily at temperatures in the range of 60–120° F. at pH values of the hardening solution between 3 and 12 although other conditions may be employed and effective hardening will occur. Alkalies such as alkali metal carbonates, sodium sesquicarbonate, borax, sodium meta-borate, sodium meta-silicate, trisodium phosphate or an alkali metal hydroxide may be employed or an organic amine will many times be found useful in controlling the pH.

An advantage which has been found of the use of hardeners in accordance with our invention is that when thin unhardened photographic emulsion layers having a minimum content of gelatin are developed in a developer containing as the hardener therein glutaraldehyde bisulfite or methyl glutaraldehyde bisulfite, increased silver density is obtained. This saving in the use of gelatin may also be accompanied by the use of a gelatin extender such as carboxymethylated soy protein as described in Gates et al. application Serial No. 749,635 or succinoylated hydroxyethyl cellulose as described in Illingsworth application Serial No. 700,555 to replace part of the gelatin in the photographic emulsion layer.

The following examples illustrate the use of hardeners for hardening gelatin layers in accordance with our invention.

EXAMPLE 1

Coatings of photographic gelatin having jelly strength of at least 150 g. Bloom were treated for times of 30 seconds to 5 minutes and at temperatures varying from 60 to 120° F. with hardening baths of the composition given. In every case the melting point of the gelatin layer so treated in tests with water had greatly increased indicating substantial hardening. The composition used for treating the gelatin coating was as follows:

| | Grams |
|---|---|
| Beta-methyl glutaraldehyde bis(sodium bisulfite) | 20.0 |
| Sodium carbonate (monohydrate) | 15.0 |
| Sodium sulfate, anhydrous | 50.0 |
| 6-Nitrobenzimidazole nitrate | 0.3 |
| Phenosafranine | 0.02 |
| Water to make 1.0 liter. | |

EXAMPLE 2

Coatings of gelatin-silver halide emulsion layers, the gelatin of which had a jelly strength of at least 150 g. Bloom, after exposure were developed in the developer compositions given, the treatment times varying from 30 seconds to 3 minutes using temperatures of 70–120° F. It was found that the gelatin emulsion layers were hardened to a substantial degree upon their development at various times and temperatures in the following compositions:

| | Grams per liter | | | |
|---|---|---|---|---|
| | No. 1 | No. 2 | No. 3 | No. 4 |
| 1-phenyl-3-pyrazolidone | | 1.5 | 3.0 | 3.0 |
| Mono methyl p-aminophenyl sulfate | 5.0 | | | |
| Hydroquinone | 10.0 | 10.0 | 20.0 | 10.0 |
| Sodium sulfite (anhydrous) | 75.0 | 75.0 | 75.0 | 75.0 |
| Sodium sulfate (anhydrous) | | | | 50.0 |
| Sodium metaborate (crystalline) | 48.0 | 48.0 | 48.0 | 48.0 |
| Sodium hydroxide | 3.5 | 3.5 | 7.5 | 4.0 |
| Potassium bromide | 5.0 | | 5.0 | 5.0 |
| 5-methyl benzotriazole | 0.3 | 0.3 | 0.3 | 0.3 |
| Beta-methyl glutaraldehyde bis-(sodium bisulfite) | 15.0 | 15.0 | 15.0 | 15.0 |
| Water to make (liters) | 1.0 | 1.0 | 1.0 | 1.0 |

EXAMPLE 3

Gelatin-silver halide photographic emulsion layers, the gelatin of which had a jelly strength of at least 150 g. Bloom, after exposure and development were fixed in fixing baths of the following compositions after having been treated in a stop bath. Times of treatment varied from 30 seconds to 5 minutes and temperatures varied from 60 to 120° F. The emulsion layers fixed with the solutions were found to have substantially increased resistance to the effect of hot water as used in testing hardness of gelatin. The fixing bath compositions used were as follows:

| | Grams per liter | |
|---|---|---|
| | No. 1 | No. 2 |
| Sodium thiosulfate (crystals) | 150 | 300 |
| Sodium carbonate monohydrate | 10 | 50 |
| Beta-methyl glutaraldehyde bis(sodium bisulfite) | 5 | 20 |
| Water to make (liters) | 1 | 1 |

EXAMPLE 4

Gelatin emulsion coatings, the gelatin of which had a jelly strength of at least 150 g. Bloom, after exposure, development and fixing were treated for 60 seconds at temperatures from 60° to 120° F. with the following composition:

| | Grams |
|---|---|
| Sodium sulfate (anhydrous) | 150 |
| Sodium carbonate, monohydrate | 50 |
| Beta-methyl glutaraldehyde bis(sodium bisulfite) | 20 |
| Water to make 1 liter. | |

The layers thus treated were found to be satisfactorily resistant to the effects of the hot water used in testing the hardness of the gelatin.

EXAMPLE 5

A reversal type photographic emulsion (of the type described in Ives U.S. Patent No. 2,563,785), the gelatin of which had a jelly strength of at least 150 g. Bloom, after exposure was developed for 1 to 2 minutes at 75° F. in a developer (pH 11.5) of the following composition:

| | Grams |
|---|---|
| Beta-methyl glutaraldehyde bis(sodium bisulfite) | 20.0 |
| N-methyl-p-aminophenol sulfate | 5.0 |
| Hydropinone | 10.0 |
| Sodium sulfite (anhydrous) | 75.0 |
| 3 - methyl - 2 - beta - phenethyl isoquinolinium bromide | 0.4 |
| 5-methyl benzotriazole | 0.2 |
| Sodium hydroxide | 9.0 |
| Water to make 1.0 liter. | |

The emulsion layer was satisfactorily hardened by this treatment and a positive image was obtained. Without the use of beta-methylglutaraldehyde bis(sodium bisulfite) or the like in the developer only a faint negative image in the emulsion layer is obtained.

EXAMPLE 6

Samples of nonhardened X-ray film, the gelatin of the emulsion of which had a jelly strength of at least 150 g. Bloom, were subjected after exposure to a processing cycle including 90 seconds prehardening at 80° F., 90 seconds development, 30 seconds acid rinse, 5 minutes fixing and 10 minutes washing in water. The prehardener used had the following formula:

| | Grams |
|---|---|
| Sodium sulfate, anhydrous | 50 |
| Sodium carbonate, monohydrate | 50 |
| Dialdehyde as shown in table below | 15 |
| Water to make 1 liter. | |

The developers used had the following formula:

| | Grams |
|---|---|
| 1-phenyl-pyrazolidone | 1.5 |
| Hydroquinone | 10 |
| Sodium sulfite, anhydrous | 65 |
| Sodium metaborate octahydrate | 40 |
| Sodium hydroxide | 1 |
| Potassium bromide | 5 |
| Tetrasodium ethylene diamine tetracetate | 3 |
| Dialdehyde—see table below | 15 |
| Water to make 1 liter. | |

The increase in thickness of the emulsion layer over the dry thickness after washing and the abrasion resistance after washing are recorded in the following table for various aldehydes used in the prehardener and in the developer.

The abrasion resistance of nonhardened film is approximately 15–17 grams.

EXAMPLE 7

A predevelopment hardening solution was prepared containing glutaraldehyde bis-sodium bisulfite as the hardening component according to the following formula:

Prehardener:

| | Grams |
|---|---|
| Sodium sulfate, anhydrous | 50 |
| Sodium carbonate, monohydrated | 12 |
| Glutaraldehyde bis(sodium bisulfite) | 15 |
| 5-methyl benzotriazole | 0.1 |
| Water to make 1 liter. | |

The pH of this solution was 10.4.

X-ray film, the gelatin of which had a jelly strength of at least 150 g. Bloom, after exposure was processed by treatment in the prehardener for 90 seconds at 80° F. followed by development for 90 seconds in a developer of the following composition:

| | Grams |
|---|---|
| 1-phenyl-3-pyrazolidone | 0.75 |
| Hydroquinone | 15.0 |
| Sodium sulfite, anhydrous | 65.0 |
| Sodium metaborate, $8H_2O$ | 40.0 |
| Sodium hydroxide | 1.3 |
| Potassium bromide | 5.0 |
| Tetrasodium ethylene diamine tetracetate | 3.0 |
| Water to make 1 liter. | |

A control film was developed for the same time in this developer without the prehardening treatment. Both films were then rinsed for 15 seconds at 80° F., fixed for 90 seconds in a nonhardening sodium ammonium thiosulfate fixer and washed for 90 seconds in water.

The net increase in thickness of the two films when wet was measured, the control showing an increase of .0048 inch compared to 0.0031 inch increase for the hardened film. Further samples of the two films were subjected to the test for abrasion resistance using a weighted stylus. The emulsion surface of the control scratched with a weight of 15–17 grams on the stylus. The hardened sample resisted abrasion up to 75 grams weight on the stylus.

EXAMPLE 8

A hardening developer was prepared using the developing formula shown in Example 7, but with the addition of 15 grams of glutaraldehyde bis-sodium bisulfite. Exposed X-ray film, the gelatin of which had a jelly strength of at least 150 g. Bloom, was processed in this developer solution and in a control developer of the composition shown in Example 7 without the hardener. The developing time was 90 seconds at 80° F. following by rinsing, fixing and washing as described in Example 7. The

*Hardening properties of various aldehydes in photographic processing solutions*

| Hardening properties of dialdehydes | Dialdehyde used | Time of treatment at 80° F. (sec.) | Swell of film based on dry thickness after washing (in.) | Abrasion resistance after washing (grams) |
|---|---|---|---|---|
| Prehardener | Beta-methyl glutaraldehyde bisulfite. | 90 | 0.0048 | 93 |
| | Malonaldehyde | 90 | 0.0051 | 50 |
| | Mesoxaldehyde | 90 | 0.0058 | 15–18 |
| | Adipaldehyde | 90 | 0.0063 | 15–18 |
| Developer | Beta-methyl glutaraldehyde bisulfite. | 90 | 0.0048 | 64 |
| | Malonaldehyde | 90 | 0.0058 | 33 |
| | Mesoxaldehyde | 90 | 0.0059 | 15–17 |
| | Adipaldehyde | 90 | 0.0058 | 15–17 | photographic characteristics are shown in the following table:

*Photographic effects of glutaraldehyde bis(sodium bisulfite) on X-ray film*

| Developer | Contrast (gamma) | Density, base and fog | Relative speed at a density of 0.85 above base and fog |
|---|---|---|---|
| Control | 2.6 | .18 | 500 |
| Hardening developer | 2.3 | .26 | 500 |

The effect of the hardener on swelling, melting point, and abrasion resistance is shown in the following table:

| Developer | Net swell, in. | Abrasion resistance (g.) | M.P. (° C.) |
|---|---|---|---|
| Control (no hard.) | .0048 | 15–17 | 90 |
| Developer with hardener | .0032 | 72 | [1] 176 |

[1] At 134.6 p.s.i.

EXAMPLE 9

High speed type gelatin silver halide film, the gelatin of which had a jelly strength of at least 150 g. Bloom, after exposure was processed at 68° F. for 5 minutes with a developer having the following basic composition, the pH of which was adjusted to 9.8. In some cases, glutaraldehyde bisulfite or beta-methyl glutaraldehyde bisulfite were added, both with and without a solubilized anthraquinone antifoggant agent. The composition of the basic developer was as follows:

```
                                                    G./l.
1-phenyl-3-pyrazolidone _____ 0.5
Hydroquinone _____ 5.0
Sodium sulfite, anhydrous _____ 25
Sodium carbonate, monohydrate _____ 25
Potassium bromide _____ 2.0
Water to 1,000 cc.
```

The effect obtained in the processing of the high speed film with the antifoggant without hardener, with the hardener alone, and with the combination of hardener and antifoggant were as follows:

| Variation | Speed (rel. log E) | Gamma | Gross fog |
|---|---|---|---|
| Basic developer—no addend | 3.30 | .87 | .17 |
| Basic developer plus 0.2 g./l. of 2-anthraquinone sulfonic acid | 3.35 | .89 | .16 |
| Basic developer plus 10 g./l. glutaraldehyde bisulfite | 3.45 | .69 | .45 |
| Basic developer plus 10 g./l. glutaraldehyde bisulfite plus 0.2 g./l. 2-anthraquinone sulfonic acid | 3.30 | .81 | .14 |
| Basic developer plus 10 g./l. beta-methylglutaraldehyde bisulfite | 3.67 | .48 | .84 |
| Basic developer plus 10 g./l. beta-methylglutaraldehyde bisulfite plus 0.2 g./l. 2-anthraquinone sulfonic acid | 3.24 | .83 | .14 |

When other anthraquinone antifoggants were employed the results obtained in the developer containing glutaraldehyde bisulfite are shown in the following table:

| Variation | Conc. (g./l.) | Speed (rel. log E) | Gamma | Gross fog |
|---|---|---|---|---|
| None | | 3.45 | .69 | .45 |
| 1-anthraquinone sulfonic acid | 0.2 | 3.26 | .87 | .19 |
| 2-anthraquinone sulfonic acid | 0.2 | 3.33 | .93 | .14 |
| 2-anthraquinone carboxylic acid | 0.2 | 3.33 | .95 | .14 |
| 1,8-antraquinone disulfonic acid | 0.2 | 3.32 | .88 | .24 |
| Do | 1.0 | 3.36 | .96 | .16 |

In processing high speed photographic film, it may also be desirable, when a prehardener is used, that a solubilized anthraquinone antifoggant also be included in the prehardener composition.

It has been found, in the case of some photographic emulsions, desirable to treat those emulsions with a hardening agent either prior to or during the processing sequence. It is often desirable to treat such solutions with a prehardening solution during the first stages of processing. Formaldehyde has been used as the hardening agent in prehardening solutions for emulsions in which gelatin is the vehicle. However, as pointed out above, the dialdehydes referred to herein are free of some of the disadvantages of formaldehyde. It has been discovered that the prehardening by such aldehydes can sometimes be improved by the addition of resorcinal or phloroglucinol to the prehardening bath. The following examples illustrate the improvement which in one case was obtained when prehardening with succinaldehyde, glutaraldehyde and beta-methyl glutaraldehyde by adding resorcinol or phloroglucinol to the prehardener bath. A comparison with formaldehyde prehardening is also included.

EXAMPLE 10

An aqueous prehardening solution was prepared with a salt content as follows:

```
                                          G./100 ml. of solution
Sodium meta-phosphate _____ 0.15
Sodium bisulfite _____ 0.2
Sodium sulfate _____ 15.5
```

Amounts of hardener and resorcinol were added as indicated in the accompanying table, the pH having been adjusted to 6 unless indicated to the contrary. Samples of a gelatin-silver halide color film, the gelatin of which had a jelly strength of at least 150 g. Bloom, which were about 7 months old, after exposure were prehardened in one of the solutions for 2 minutes followed by a 2-minute wash in tap water, development for 2¾ minutes in MQ Developer [1] and a wash for 2 minutes in tap water all at 26.5 C. temperature.

[1] MQ Developer:

```
                                                      G.
Sodium metaphosphate _____ 1.0
Sodium bisulfite, anhydrous _____ 40.0
Elon _____ 0.6
Hydroquinone _____ 15.0
Sodium bromide _____ 4.0
Sodium thiocyanate _____ 4.5
Potassium iodide _____ 0.007
Sodium hydroxide _____ 16.0
Water to 1 liter.
```

The results obtained were as follows:

| Prehardener | Resorcinol, percent | Swelling in microns (Increase over dry thickness) | | | |
|---|---|---|---|---|---|
| | | After 2 min. in tap water | After 2¾ min. in MQ developer | Tap water wash after development | |
| | | | | After 2 min. | Maximum |
| 1.35% succinaldehyde | 0 | 38 | 43 | 44 | 57 |
| Do | 1.05 | 33 | 38 | 36 | 49 |
| 0.81% succinaldehyde | 0 | 43 | 49 | 50 | 65 |
| Do | 0.63 | 38 | 44 | 44 | 58 |
| 1.28% glutaraldehyde | 0 | 29 | 33 | 31 | 40 |
| Do | 1.04 | | | 27 | |
| 1.25% beta-methyl glutaraldehyde | 0 | 43 | 45 | 48 | 63 |
| Do | 0.73 | 40 | 43 | 45 | 60 |
| Prehardener X (pH ca. 9.5) [1] | 0 | 42 | 45 | 47 | 62 |
| No prehardener treatment | 0 | 71 | 93 | 124 | 147 |

[1] Prehardener X:
  Sodium metaphosphate _____ g__ 1.5
  Sodium bisulfite, anhydrous _____ g__ 1.0
  Tetrasodium pyrophosphate, decahydrate __g__ 33.5
  Sodium bromide _____ g__ 2.0
  Sodium sulfate, anhydrous _____ g__ 155.0
  Sodium hydroxide _____ g__ 0.1
  Formalin (40% formaldehyde) _____ ml__ 16.33
  Water to 1 liter.
  pH should be 9.5.

EXAMPLE 11

The procedure described in Example 10 was repeated except that phloroglucinol was used in place of resorcinol. The results obtained were as follows:

| Prehardener | Phloroglucinol, percent | Swelling in microns (increase over dry thickness) Tap water wash after development— after 2 min. |
|---|---|---|
| 1.35% succinaldehyde | 0 | 46 |
| Do | 0.61 | 33 |

In processing gelatin-silver halide emulsions in which the gelatin has a jelly strength of at least 150 g. Bloom, as developers for the emulsion can be used orthohydroxy developing agents such as pyrogallol, pyrocatechol and also may be present an auxiliary agent such as Elon. As the keeping properties of these developers are somewhat limited, it may also be desirable in using them that there be added for its preservative effect a phenol or aniline meta-substituted by hydroxy or amino groups or some combination thereof. Compounds useful in this connection are resorcinol, s-triaminobenzene, phloroglucinol or a meta-aminophenol. In developing emulsions with these developers, it may also be desirable to include a dialdehyde as described herein in the developing composition or in the prehardener employed before the development step. By the addition of a meta-substituted hydroxy or amino aromatic compound as described, the life of the developer depending upon pyrogallol or pyrocatechol for the developing agent is appreciably extended.

A useful developer containing hardening agents of the present invention has the following composition:

```
                                                  Grams
1-phenyl-3-pyrazolidone _____ 1.30
Na2SO3 _____ 80.00
Hydroquinone _____ 2.70
Beta-methyl glutaraldehyde bis(sodium bisulfite)__ 16.00
Na2CO3 _____ 10.00
KBr _____ 2.00
H2O to make 1 liter.
```

Developers such as the above, containing 3-pyrazolidone developing agents in conjunction with the hardening agents of this invention have a tendency to produce a high level of fog on negative materials processed in them, e.g., at temperatures of 80–90° F. It has been found that this tendency can be curbed to some extent by the addition of resorcinol as an antifoggant. It has been discovered further that when resorcinol is used in conjunction with the known antifoggant 5-methylbenzotriazole that the effectiveness of the combination exceeds that of either antifoggant alone. For example, the addition of 8 grams per liter of resorcinol to the developer composition described above reduced the gross fog level from 0.34 to 0.23 when a fast gelatino-silver halide emulsion was developed for 2½ minutes at 85° F.; a relative emulsion speed of 132 being obtained in each case. Similarly, the addition of 0.32 gram per liter of 5-methylbenzotriazole to the basic developer reduced the gross fog level to 0.16 when the same emulsion was developed at 85° F. for 3¼ minutes to obtain a relative emulsion speed of 158. When the same emulsion was developed under the same conditions with the basic developer containing larger amounts of 5-methylbenzotriazole, for example, 0.8 to 1.6 grams per liter, the gross fog level was reduced to the desirably low value of 0.11 but the relative emulsion speed was undesirably reduced to 90 in the first instance and to 58 in the latter. However, when a synergistic combination of 6 grams per liter of resorcinol and 0.32 gram per liter of 5-methylbenzotriazole was added to the basic developer, a desirably low gross fog level of 0.11 was obtained without undesirably reducing the relative emulsion speed which remained at 103. The effectiveness of the combination of 6 grams of resorcinol and 0.32 gram of 5-methylbenzotriazole in the basic developer composition was also observed when development was pushed to compensate for under-exposure. For example, development of the same fast emulsion for six minutes rather than three minutes at 85° F. produced a negative with a gross fog level of 0.16 and a relative emulsion speed of 150. Other ratios of resorcinol to 5-methylbenzotriazole and of the combined antifoggants to developer are effective in various degrees in reducing the fogging tendency of developers of the type described above.

These examples illustrate the use of amines as pH control agents in processing solutions using hardeners as specified herein.

EXAMPLE 12

A photographic developer was prepared having the following ingredients incorporated in one liter of water:

```
                                                  Grams
4-methyl-1-phenyl-3-pyrazolidone _____ 1.0
Hydroquinone _____ 10.0
Benzotriazole _____ 0.8
Dimethylaminoethanol _____ 20.0
Dimethylaminoethanol sulfur dioxide addition product _____ 30.0
Methylbenzotriazole _____ 0.2
Glutaraldehyde _____ 5.0
```

EXAMPLE 13

A photographic developer was prepared having the following ingredients incorporated in one liter of water:

| | Grams |
|---|---|
| 4,4-dimethyl-1-phenyl-3-pyrazolidone | 1.0 |
| Hydroquinone | 10.0 |
| Benzotriazole | 0.3 |
| Methylbenzotriazole | 0.1 |
| 1-phenyl-5-mercaptotetrazole | 0.05 |
| Dimethylaminoethanol | 20.0 |
| Dimethylaminoethanol sulfur dioxide addition product | 30.0 |
| Glutaraldehyde | 5.0 |

In the examples, the dimethylaminoethanol and dimethylaminoethanol sulfur dioxide addition products are present in approximately equimolar proportions. An equimolar mixture of these two materials is readily prepared by adding gaseous sulfur dioxide to dimethylaminoethanol.

The liquid photographic developer concentrates of Examples 12 and 13 were used to develop high speed medical X-ray film, the development being at 3 minutes at 60° F. The results obtained compared with the results using a standard developer were as follows:

| Developer | Relative speed | Gamma | $D_{max}$ | Gross fog |
|---|---|---|---|---|
| Standard | 380 | 2.28 | 3.00 | 0.12 |
| Example 12 | 400 | 2.30 | 3.48 | 0.16 |
| Example 13 | 380 | 2.47 | 3.50 | 0.13 |

EXAMPLE 14

A developer was prepared containing therein a silver halide solvent having the following formula:

| | Grams |
|---|---|
| Sodium sulfite | 30 |
| 1-phenyl-3-pyrazolidone | 2 |
| Hydroquinone | 10 |
| Potassium bromide | 4.1 |
| Potassium iodide | 0.32 |
| Sodium thiosulfate·$5H_2O$ | 100 |
| 2-diethylaminoethanol | 78.3 |
| Glutaraldehyde bis(sodium bisulfite) | 5 |

Water to make 1 liter.
pH adjusted to 10.13.

This composition was used to process Kodak Verichrome Pan Film at 75° F. with no agitation. Clearing was accomplished in 6 minutes and the quality of the resultant image compared favorably with that produced by conventional development processing in the same composition but with omission of the glutaraldehyde bis bisulfite resulted in severe reticulation.

In compositions in accordance with the invention, one may if desired, employ a thickening agent such as would adapt the developing compositions to use for processing when in capsulated form. Thickening agents such as guar gum, carboxymethyl cellulose, hydroxyethyl cellulose or the like may be useful in this connection.

A convenient method for preparing succinaldehyde for use in hardening photographic gelatin is by hydrolyzing 2,5-diethoxytetrahydrofuran accompanied by refluxing in the presence of acetic acid or the like. Where the purity of product is important, it may be desirable to first refine the diethoxytetrahydrofuran such as by dissolving it in a petroleum distillate (such as hexane) and treating with activated alumina. As an example of a procedure by which succinaldehyde may be prepared, a mixture of 600 parts of 2,5-diethoxytetrahydrofuran, 300 parts of distilled water, 1 part of acetic acid and 0.5 part of hydroquinone was heated under a slow stream of nitrogen, the alcohol-water azeotrope being removed continuously through a 12-inch column packed with 3/16 inch helices, fitted with a variable reflux head. Regulating the rate of takeoff to maintain a distillate temperature of less than 80° C., the pot temperature reached a temperature of 101° C. after 3½ hours when reaction is considered complete. To recover the succinaldehyde, the mass is cooled, the water is removed by azeotropic distillation using benzene, the benzene is then boiled off and the product is recovered by distillation into a well-cooled receiver. The succinaldehyde is dissolved in water or other solvent to inhibit polymerization of the succinaldehyde.

The invention has been described in considerable detail with particular reference to certain preferred embodiments thereof, but it will be understood that variations and modifications can be effected within the spirit and scope of the invention as described hereinabove and as defined in the appended claims.

We claim:

1. In the processing of a gelatin-silver halide photographic emulsion layer, the step which comprises treating the emulsion layer with a bath including a considerable concentration of pH buffering agent and a gelatin hardening agent selected from the group consisting of the dialdehydes, the aldehyde groups of which are joined by an uninterrupted linear carbon chain of 2-3 carbon atoms and their bisulfite adducts.

2. A method of hardening a gelatin containing photographic emulsion layer which comprises treating said layer with an aqueous solution containing a considerable concentration of pH buffering agent and a gelatin hardening agent selected from the group consisting of the dialdehydes, the aldehyde groups of which are joined by an uninterrupted linear carbon chain of 2-3 carbon atoms and their bisulfite adducts.

3. A method of hardening a gelatin containing photographic emulsion layer which comprises treating said layer with an aqueous solution having a considerable concentration of alkali metal ion therein and a gelatin hardening agent selected from the group consisting of the dialdehydes, the aldehyde groups of which are joined by an uninterrupted linear carbon chain of 2-3 carbon atoms and their bisulfite adducts.

4. A method of hardening a gelatin containing photographic emulsion layer which comprises treating said layer with an aqueous solution having a considerable concentration of an organic amine buffering agent therein and a gelatin hardening agent selected from the group consisting of the dialdehydes, the aldehyde groups of which are joined by an uninterrupted linear carbon chain of 2-3 carbon atoms and their bisulfite adducts.

5. In the processing of a gelatin-silver halide photographic emulsion layer the step which comprises treating the emulsion layer with a bath including a considerable concentration of pH buffering agent and as a hardening agent therein beta-methyl glutaraldehyde bisulfite.

6. In the processing of a gelatin-silver halide photographic emulsion layer the step which comprises treating the emulsion layer with a bath including a considerable concentration of pH buffering agent and as a hardening agent therein glutaraldehyde bisulfite.

7. A photographic developer especially adapted for processing gelatin-containing high speed photographic emulsions, the gelatin of which has a jelly strength of at least 150 g. Bloom, which developer contains a silver halide developer, compound selected from the group consisting of the organic amines having the formula:

in which $R_1$ = hydroxyalkyl of 1-4 carbon atoms,
$R_2$ = alkyl of 1-4 carbon atoms,
$R_3$ is selected from $R_1$ and $R_2$, and SO₂ adducts thereof, and a gelatin hardening agent selected from the group consisting of succinaldehyde, glutaraldehyde and beta-methyl glutaraldehyde and the bisulfite derivatives of glutaraldehyde and beta-methyl glutaraldehyde.

8. A photographic developer especially adapted for processing gelatin-containing high speed photographic emulsions, the gelatin of which has a jelly strength of at least 150 g. Bloom, which developer contains a silver halide developer, compound selected from the group consisting of the organic amines having the formula:

in which
$R_1$=hydroxyalkyl of 1–4 carbon atoms,
$R_2$=alkyl of 1–4 carbon atoms,
$R_3$ is selected from $R_1$ and $R_2$ and SO₂ adducts thereof, plus as a gelatin hardener therein glutaraldehyde.

9. A photographic developer especially adapted for processing gelatin containing high speed photographic emulsions, the gelatin of which has a jelly strength of at least 150 g. Bloom which developer contains alkali metal salts, a silver halide developer, as the gelatin hardener therein beta-methyl glutaraldehyde bis-sodium bisulfite and solubilized anthraquinone antifoggant.

10. A photographic developer especially adapted for processing gelatin containing high speed photographic emulsions, the gelatin of which has a jelly strength of at least 150 g. Bloom which developer contains alkali metal salts, a silver halide developer, as the gelatin hardener therein beta-methyl glutaraldehyde bis-sodium bisulfite and sodium anthraquinone sulfonate antifoggant.

11. A photographic prehardener processing solution which comprises an aqueous solution with a considerable concentration of alkali metal ions and a gelatin hardener selected from the group consisting of the dialdehydes, the aldehyde groups of which are joined by an uninterrupted linear carbon chain of 2–3 carbon atoms and their bisulfite adducts and a polyhydroxybenzene selected from the group consisting of resorcinol and phloroglucinol.

12. A photographic developer especially adapted for processing high speed photographic emulsions which developer contains a considerable concentration of alkali metal ions therein including those of sodium sulfite, a silver halide developer, as a gelatin hardener therein beta-methyl glutaraldehyde bis-sodium bisulfite and resorcinol antifoggant.

13. A photographic developer especially adapted for processing high speed photographic emulsions which developer contains a silver halide developer, a considerable concentration of alkali metal ion including that of sodium sulfite, a bisulfite adduct of a dialdehyde, the aldehyde groups of which are joined by an uninterrupted linear carbon chain of 2–3 carbon atoms and a mixture of resorcinol and phloroglucinol.

14. A prehardener solution comprising an aqueous solution of sodium metaphosphate, sodium bisulfite, and sodium sulfate containing as a hardener therein succinaldehyde.

15. A photographic developer comprising an aqueous solution of beta-methyl glutaraldehyde bis alkali metal bisulfite, phenyl pyrazolidone, hydroquinone, sodium sulfite, sodium metaborate, sodium hydroxide, potassium bromide and a sequestering agent.

16. A developing solution for gelatin-silver halide photographic emulsions comprising (1) an alkali metal salt to adjust the hydrogen ion, (2) a preservative, (3) an alkali metal bromide, (4) a silver halide developer agent, and (5) beta-methyl glutaraldehyde bis alkali metal bisulfite.

17. A photographic developer especially adapted for processing gelatin containing high speed photographic emulsions, the gelatin of which has a jelly strength of at least 150 g. Bloom which developer contains a silver halide developing agent, a considerable concentration of pH buffering agent, and a gelatin hardening agent selected from the group consisting of the dialdehydes, the aldehyde groups of which are joined by an uninterrupted linear carbon chain of 2–3 carbon atoms and their bisulfite adducts.

18. A solution for hardening photographic gelatin layers which comprises an aqueous solution containing a hardener and a considerable proportion of an alkaline pH buffering agent in an amount sufficient to maintain the pH of the solution upon treating photographic gelatin layers therewith, the hardener being a dialdehyde in which the aldehyde groups are joined by an uninterrupted carbon chain of 2–3 carbon atoms or a bisulfite adduct thereof and the buffering agent being at least one of an alkali metal carbonate, an alkali metal borate, an alkali metal phosphate, or an organic amine.

References Cited by the Examiner
UNITED STATES PATENTS
2,785,996   3/1957   Kress _____ 8—116.4 X NORMAN G. TORCHIN, *Primary Examiner.*
ALEXANDER D. RICCI, *Examiner.*
J. RAUBITSCHEK, *Assistant Examiner.*